United States Patent [19]

Kosinski

[11] Patent Number: 5,237,008
[45] Date of Patent: Aug. 17, 1993

[54] POLYOXYMETHYLENE COMPOSITIONS CONTAINING LINEAR LOW DENSITY POLYETHYLENE

[75] Inventor: Leonard E. R. Kosinski, Washington, W. Va.

[73] Assignee: E. I. Du Pont de Nemours and Company, Wilmington, Del.

[21] Appl. No.: 806,285

[22] Filed: Dec. 13, 1991

Related U.S. Application Data

[63] Continuation of Ser. No. 606,080, Oct. 22, 1990, abandoned.

[51] Int. Cl.$^5$ .................. C08L 61/02; C08L 27/18; C08L 23/06; C08L 23/08
[52] U.S. Cl. .................... 525/154; 525/164; 525/199
[58] Field of Search ................ 525/154, 164, 199

[56] References Cited

U.S. PATENT DOCUMENTS

| | | | |
|---|---|---|---|
| 3,377,313 | 4/1968 | Jupa et al. | 260/41 |
| 3,704,275 | 11/1972 | Burg et al. | 260/37 |
| 3,795,715 | 3/1974 | Burg et al. | 260/823 |
| 3,969,313 | 7/1976 | Aishima et al. | 260/40 |
| 3,980,734 | 9/1976 | Burg et al. | 260/860 |
| 4,391,741 | 7/1983 | Masamoto et al. | 252/511 |
| 4,645,785 | 2/1987 | Heinz et al. | 524/100 |
| 4,670,508 | 6/1987 | Ohoaira et al. | 525/64 |
| 4,810,733 | 3/1989 | Sakuma et al. | 523/206 |
| 4,843,129 | 6/1989 | Spenadel et al. | 525/240 |
| 4,873,282 | 10/1989 | Yui et al. | 524/496 |
| 5,045,401 | 9/1991 | Tabor et al. | 429/516 |
| 5,066,526 | 11/1991 | German, Jr. | 428/35.2 |

FOREIGN PATENT DOCUMENTS

| | | |
|---|---|---|
| 2447806 | 2/1976 | Fed. Rep. of Germany . |
| 42-19498 | 10/1967 | Japan . |
| 46-41456 | 12/1971 | Japan . |
| 49-40346 | 4/1974 | Japan . |
| 50-52166 | 5/1975 | Japan . |
| 50-103556 | 8/1975 | Japan . |
| 50-158643 | 12/1975 | Japan . |
| 51-114447 | 10/1976 | Japan . |
| 53-108142 | 9/1978 | Japan . |
| 60-86115 | 5/1985 | Japan . |
| 62-85908 | 4/1987 | Japan . |
| 62-253650 | 11/1987 | Japan . |
| 63-33465 | 2/1988 | Japan . |
| 63-196646 | 8/1988 | Japan . |

OTHER PUBLICATIONS

"New Polyethylens" Package Engineering pp. 39-40 (Feb., 1980).
"Something New In Polyethylene: Linear Low-Density Pe" Plastics World p. 86 (Dec., 1979).

*Primary Examiner*—James J. Seidleck
*Assistant Examiner*—W. R. H. Clark

[57] ABSTRACT

Incorporation of 0.2 to 3.0 weight percent of linear low density polyethylene into polyoxymethylene compositions results in improved elongation for such compositions.

11 Claims, No Drawings

POLYOXYMETHYLENE COMPOSITIONS CONTAINING LINEAR LOW DENSITY POLYETHYLENE

This is a division of application Ser. No. 07/606,080, filed Oct. 22, 1990, now abandoned.

BACKGROUND

1. Technical Field

This invention relates to polyoxymethylene compositions having increased elongation at break due to the inclusion therein of low levels of linear low density polyethylene (hereinafter referred to as "LLDPE").

Polyoxymethylene, also commonly referred to as polyacetal, compositions are generally understood to include compositions based on homopolymers of formaldehyde, the terminal groups of which are end-capped by esterification or etherification, as well as copolymers of formaldehyde or of cyclic oligomers of formaldehyde and other monomers that yield oxyalkylene groups with at least two adjacent carbon atoms in the main chain, the terminal groups of which copolymers can be hydroxyl terminated or can be end-capped by esterification or etherification. The proportion of the comonomers can be up to 20 weight percent.

Compositions based on polyoxymethylenes of relatively high molecular weight, i.e., 10,000 to 100,000 are useful in preparing semi-finished and finished articles by any of the techniques commonly used with thermoplastic materials, e.g., compression molding, injection molding, extrusion, blow molding, rotational molding, melt spinning, stamping and thermoforming. Finished articles made from such compositions possess desirable physical properties, including high stiffness, strength, low coefficient of friction, and good solvent resistance. However, in certain applications, it would be desirable to increase the elongation at break of the polyoxymethylene composition. By the present invention, the elongation at break of polyoxymethylene is found to be increased by the inclusion therein of low levels of a particular type of polyethylene; namely, LLDPE.

The compositions of the present invention are useful in those applications where it is desired to use a polyoxymethylene composition having increased elongation at break.

2. Background Art

The references below provide background information on polyolefin/thermoplastic resin compositions. While some of these references disclose of use of polyethylene in polyoxymethylene, none of the references teach that use of low levels of linear low density polyethylene, as opposed to other types of polyethylenes, in polyoxymethylene acts to increase elongation in polyoxymethylene. In fact, some of the references teach that the opposite effect is achieved, namely, that the inclusion of polyethylene into polyoxymethylene results in a decrease in the elongation of the polyoxymethylene.

U.S. Pat. Nos. 3,704,275; 3,795,715; and 3,980,734 disclose polyoxymethylene compositions containing homo- and co-polymers of polyethylene. No specific mention is made of linear low density polyethylene.

U.S. Pat. No. 3,969,313 discloses compositions comprised of a thermoplastic material, including polyoxymethylene, and 5-70 weight percent of a polyolefin composition comprised of a polyolefin and a reactive inorganic filler. The polyolefins which may be used include high density polyethylene, low density polyethylene, crystalline polypropylene, crystalline polybutene, poly-3-methyl-butene-1, poly-4-pentene-1, and copolymers comprising more than about 80 weight percent ethylene or propylene and less than 20 percent by weight of a comonomer selected from ethylene, propylene, butene-1, pentene-1, hexene-1, 3-methyl butene-1, and 4-methyl pentene-1.

U.S. Pat. No. 4,670,508 discloses that the inclusion of between 10-30 weight percent of ultra-high molecular weight polyethylene, or a maleic anhydride modified version thereof, into polyoxymethylene results in a decrease in the elongation at break of the polyoxymethylene from 24% to less than 10%.

Japanese Kokai Patent No. 49-40346 discloses that the elongation of polyoxymethylene is decreased by the inclusion therein of 10% of high density polyethylene (Table 1, Comparative Example 1), that the inclusion of 10% of linear low density polyethylene decreases the elongation of polyoxymethylene (Table V, Comparative Example 3), that the inclusion of 10% of low density polyethylene increases the elongation of polyoxymethylene slightly from 7% to 10% (Table V, Comparative Example 2), that the inclusion of 25% of high density polyethylene decreases that elongation of polyoxymethylene (Table VI, Comparative Examples), and that the inclusion of 20% high molecular weight polyethylene increases the elongation of polyoxymethylene from 7% to 12%.

Japanese Tokukai No. 62-253650 discloses compositions containing polyoxymethylene and 2-30% polyethylene, said compositions having improved squeak resistance. The reference teaches away from use of low levels of polyethylene and from use of polyethylenes having a melt index of less than 10. There is no mention of linear low density polyethylene in this reference, nor that the incorporation of linear low density polyethylene into polyoxymethylene improves the elongation at break of the polyoxymethylene.

U.S. Pat. No. 3,377,313 discloses polyoxymethylene compositions containing a dispersion of carbon black in a thermoplastic polymeric material, such as, amongst others, a polyolefin, including polyethylene. No specific mention is made of linear low density polyethylene.

SUMMARY OF THE INVENTION

The present invention relates to polyoxymethylene compositions containing 0.2 to 3.0 weight percent -LLDPE, said weight percent being based upon the weight of the polyoxymethylene and the LLDPE. The resultant polyoxymethylene compositions are characterized as having improved elongation at break over polyoxymethylene alone or polyoxymethylene with other types of polyethylene. The resultant compositions are useful in applications where it is desired to use a polyoxymethylene composition having improved elongation.

DESCRIPTION OF THE INVENTION

It has been unexpectedly found in the present invention that low levels of LLDPE significantly increase the elongation at break of polyoxymethylene compositions. Such an effect is unexpected because certain types of polyethylene are known to decrease, or, at most, to have no effect on, the elongation at break of polyoxymethylene polymers For example, U.S. Pat. No. 4,670,508 provides examples wherein the elongation at break of polyoxymethylene is decreased from 27% to less than 10% by the inclusion therein of an ultra-high molecular weight polyethylene As another example, Japanese Kohai Patent No. 74/40346 teaches that 10% of a high density polyethylene in polyoxymethylene results in a 30% decrease in the elongation of the resultant polyoxymethylene composition. It further teaches that 10% of a low density polyethylene has no effect on the elongation of a polyoxymethylene composition. It also teaches that 10% of a polyethylene-butene-1 copolymer (i.e., a LLDPE) has a negative effect on the elongation of a polyoxymethylene composition. Thus, the fact low levels of LLDPE resulted in a significant increase in the elongation at break of polyoxymethylene was quite unexpected.

1. Composition

The compositions of the present invention consist essentially of 97 to 99.8 weight percent of component (a) polyoxymethylene and 0.2 to 3.0 weight percent of component (b) LLDPE Preferably, the compositions consist essentially of 97.0 to 99.65 weight percent of component (a) and 0.35 to 3.0 weight percent of component (b). Most preferably, the compositions consist essentially of 97.5 to 99.5 weight percent of component (a) and 0.5 to 2.5 weight percent of component (b). All the above-mentioned weight percents are based upon the weight percents of components (a) and (b) only. It is further noted that a higher loading of LLDPE may increase the elongation at break of a polyoxymethylene composition but that such a higher loading may result in a loss of other physical properties of the polyoxymethylene. Higher loadings of LLDPE may also give rise to molded parts having undesirable characteristics, such as LLDPE and polyoxymethylene separation (de-lamination), sink marks, flow marks, etc.

1a. Component (a): Polyoxymethylene

The term "polyoxymethylene" as used herein includes homopolymers of formaldehyde or of cyclic oligomers of formaldehyde, the terminal groups of which are end-capped by esterification or etherification, and copolymers of formaldehyde or of cyclic oligomers of formaldehyde and other monomers that yield oxalkylene groups with at least two adjacent carbon atoms in the main chain, the terminal groups of which copolymers can be hydroxyl terminated or can be end-capped by esterification or etherification.

The polyoxymethylene used in the compositions of the present invention can be branched or linear and will generally have a number average molecular weight in the range of 10,000 to 100,000, preferably 20,000 to 75,000. The molecular weight can conveniently be measured by gel permeation chromatography in m-cresol at 160° C. using a Du Pont PSM bimodal column kit with nominal pore size of 60 and 1000 A. Although polyoxymethylenes having higher or lower molecular weight averages can be used, depending on the physical and processing properties desired, the polyoxymethylene molecular weight averages mentioned above are preferred to provide optimum balance of good mixing of the various ingredients to be melt blended into the composition with the most desired combination of physical properties in the molded articles made from such compositions.

As indicated above, the polyoxymethylene can be either a homopolymer, a copolymer or a mixture thereof. Copolymers can contain one or more comonomers, such as those generally used in preparing polyoxymethylene compositions. Comonomers more commonly used include alkylene oxides of 2–12 carbon atoms and their cyclic addition products with formaldehyde. The quantity of comonomer will not be more than 20 weight percent, preferably not more than 15 weight percent, and most preferably about 2 weight percent. The most preferred comonomer is ethylene oxide. Generally polyoxymethylene homopolymer is preferred over copolymer because if its greater stiffness. Preferred polyoxymethylene homopolymers include those whose terminal hydroxyl groups have been end-capped by a chemical reaction to form ester or ether groups, preferably acetate or methoxy groups, respectively.

1b. Component (b): LLDPE

The component (b) "LLDPE" is linear low density polyethylene. LLDPE is well known in the art. LLDPE is commercially available or can be made by techniques readily available to those skilled in the art. Generally, LLDPE is prepared by polymerizing ethylene or ethylene and alpha-olefin comonomers in solution phase or gas phase reactors using transition metal catalysts, particularly Ziegler or Phillips types, as initiators.

LLDPE generally has a density of less than or equal to 0.94 grams per cubic centimeter. LLDPE polymers are copolymers of ethylene and an alpha-olefin comonomer, such as, for example, propylene, butene, pentene, hexene, 4-methyl-1-pentene, or octene. Preferably, the LLDPE is an ethylene-butene copolymer.

It is understood by those skilled in the art that LLDPE is separate and distinct from conventional low density polyethylene (hereinafter referred to as LDPE). LDPE polymers have long chain branching while LLDPE polymers lack long chain branching in the molecular structure. The lack of long chain branching in LLDPE is due to the method by which it is produced.

LLDPE may contain additional additives or ingredients, such as antioxidants, customarily included in such polymers. Further, the LLDPE useful herein can be incorporated into polyoxymethylene as part of a color concentrate In the color concentrate, the LLDPE serves as a carrier resin Color concentrates are generally comprised of 1 to 90 percent by weight of pigments, such as carbon black, well dispersed in a carrier resin. In cases where LLDPE is incorporated into polyoxymethylene as part of a color concentrate, the weight percent LLDPE, in the polyoxymethylene composition, will be the same as given above, i.e., between 0.2 and 3.0 weight percent, as based upon the weight of the polyoxymethylene and the LLDPE.

Although the LLDPE can contain additional additives or ingredients customarily included therein, some of the additives or ingredients can have an adverse effect on the oxidative or thermal stability of polyoxymethylene. Further, the LLDPE may contain some impurities that can have an adverse effect on the oxidative or thermal stability of polyoxymethylene. While it is not expected that the presence of these additives, ingredients, or impurities will exert a major influence on the elongation of the composition, (unless of course, such additives, ingredients, or impurities are present in grossly de-stabilizing amounts) it is recommended that if maximum thermal and oxidative stability for the polyoxymethylene composition is desired, then the LLDPE, and any additional components of the composition, should not contain appreciable quantities of such types of additives, ingredients, or impurities.

1c. Additional Ingredients

It should be understood that the compositions of the present invention can include, in addition to the polyoxymethylene and the linear low density polyethylene, other ingredients, modifiers and additives as are generally used in polyoxymethylene molding resins, including thermal stabilizers and co-stabilizers, anti-oxidants, pigments, colorants, toughening agents (such as thermoplastic polyurethanes), reinforcing agents, uv stabilizers (especially those that are benzotriazoles or benzophenones), hindered amine light stabilizers (especially those wherein the hindered nitrogen is of tertiary amine functionality or wherein the hindered amine light stabilizer contains both a piperidine or piperazinone ring and a triazine ring), nucleating agents (such as boron nitride or talc), lubricants (such as silicone oil, polyethylene glycol, and ethylene bis-stearamide), glass, polytetrafluoroethylene powder or fibers and fillers.

Suitable thermal stabilizers include nylon terpolymers; poly-beta-alanine (as described in, for example, West German published appln 3715117); those stabilizers disclosed in U.S. Pat. Nos. 4,814,397; 4,766,168; 4,640,949; and 4,098,984; those stabilizers disclosed in co-pending U.S. patent application Ser. Nos. 327,664 (preferably, polyacrylamide) and 483,603 (preferably, microcrystalline cellulose); and mixtures of any of the above.

Preferred antioxidants include triethyleneglycolbis(3-(3'-tert-butyl-4'-hydroxy-5'-methylphenyl)proprionate, N,N'-hexamethylenebis(3,5-di-tert-butyl-4-hydroxyhydrocinnamide), and mixtures thereof. It should also be understood that some pigments and colorants can, themselves, adversely affect the thermal or oxidative stability of polyoxymethylene compositions but should not significantly affect physical properties (provided there is sufficient dispersion of the pigments or colorants in the polyoxymethylene).

2. Preparation of the Compositions

The compositions of the present invention can be prepared by mixing the linear low density polyethylene, which can optionally contain pigments or colorants, with the polyoxymethylene polymer at a temperature above the melting point of the polyoxymethylene component of the compositions using any intensive mixing device conventionally used in preparing thermoplastic polyoxymethylene compositions, such as rubber mills, internal mixers such as "Banbury" and "Brabender" mixers, single or multiblade internal mixers with a cavity heated externally or by friction, "Ko-kneaders", multibarrel mixers such as "Farrel Continuous Mixers", injection molding machines, and extruders, both single screw and twin screw, both co-rotating and counter rotating. These devices can be used alone or in combination with static mixers, mixing torpedoes and/or various devices to increase internal pressure and/or the intensity of mixing, such as valves, gates, or screws designed for this purpose. Extruders are preferred. Of course, such mixing should be conducted at a temperature below which significant degradation of the polyoxymethylene component of the composition will occur. Generally, polyoxymethylene compositions are melt processed between 170° C. to 280° C., preferably between 185° C. to 240° C., and most preferably 195° C. to 225° C.

Shaped articles can be made from the compositions of the present invention using any of several common methods, including compression molding, injection molding, extrusion, blow molding, rotational molding, melt spinning, and thermoforming. Injection molding is preferred. Examples of shaped articles include sheet, profiles, rod stock, film, filaments, fibers, strapping, tape, tubing, and pipe Such shaped articles can be post treated by orientation, stretching, coating, annealing, painting, laminating, and plating Such shaped articles and scrap therefrom can be ground and remolded.

Processing conditions used in the preparation of the compositions of the present invention and shaped articles made therefrom include melt temperatures of about 170–280° C., preferably 185–240° C., most preferably 195–225° C. When injection molding the compositions of the present invention, it is preferred that the mold be as cold as possible consistent with the intricacy of the shape being produced. Generally, the mold temperature will be 10–120° C., preferably 10–100° C., and most preferably about 50–90° C.

EXAMPLES

In the following examples, there are shown specific embodiments of the present invention and certain comparisons with embodiments of control experiments outside the limits of the present invention. It will be seen that the compositions of the present invention are characterized by improved elongation over that of polyoxymethylene alone.

The components used in the Examples below were as follows:

"POM" was an acetate end-capped polyoxymethylene homopolymer having a number average molecular weight of about 40,000.

"LLDPE 1" was a commercially available linear low density polyethylene copolymer of ethylene and butene having a melt flow rate of 20g/10 min and a density of 0.92g/cm$^3$.

"LLDPE 2" was a commercially available linear low density polyethylene copolymer of ethylene and butene having a melt flow rate of 53g/10 min and a density of 0.92g/cm$^3$.

"LLDPE 3" was a commercially available linear low density polyethylene copolymer of ethylene and butene having a melt flow rate of 4g/10 min and a density of 0.92g/cm$^3$.

"LLDPE 4" was a commercially available linear low density polyethylene copolymer of ethylene and butene having a melt index of about 29g/10 min and a density of about 0.92g/cm$^3$.

"LDPE was a commercially available low density polyethylene homopolymer having a melt flow rate of 12g/10 min and a density of about 0.92g/cm$^3$.

Melt flow rates given above for LLDPE and LDPE are determined in accordance with ASTM D1238, Condition E.

Each composition tested additionally contained between 0.9 and 1.0 weight percent of a thermal stabilizer system comprised of a poly(ethylene vinyl alcohol) copolymer (prepared in accordance with U.S. Pat. No. 4,766,168) and a nylon terpolymer comprised of 33% nylon 66, 23% nylon 6/10, and 43% nylon 6. Each composition tested also contained between about 0.1 and 0.15 weight percent of antioxidants recommended for use in polyoxymethylene. All compositions tested contained the same antioxidant. The compositions tested each contained about 0.5 weight percent of a polyethylene glycol lubricant having a molecular weight of 8,000. The use of thermal stabilizers, antioxidants, and lubricants is not necessary for the operability of the present invention. They were used in the following examples to improve thermal and oxidative stability and they do not exert a major influence on the elongation of the compositions tested.

Each composition was prepared as follows the components of each composition were mixed together and melt compounded on a 28mm Werner and Pfleiderer twin screw extruder with barrel temperature settings of 150° C. to 180° C., a die temperature setting of 200° C., and a screw speed of 150 rpm. The temperature of the melt as it exited the die ranged from 205° C. to 213° C. The product exiting the die was quenched in a water bath and pelletized.

Each composition was molded into tensile bars conforming to the dimensions stated in ASTM D-638, specimen type I (⅛ inch thick), on a HPM screw injection molding machine. The mold temperature setting was about 88° C., the barrel temperature settings were between 180° C. and 190° C., the screw speed was 100 rpm, the cycle time was about 65 seconds, and the temperature of melt was between 182° C. and 204° C.

The injection molded test specimens were placed in moisture-tight vacuum sealed aluminum foil packages and stored at room temperature for 21 days prior to elongation testing. The 21 day waiting period allows for completion of post molding annealing (crystallinity equilibration) which is well known to occur for polyoxymethylene. Elongational properties measured after this 21 day waiting period will remain relatively constant over time. For 48 hours prior to elongational testing, the test samples were conditioned at 23° C. and 50 percent relative humidity to allow the samples to reach moisture equilibration. Samples were then tested for elongation using ASTM D-638 procedure, at an extension rate of 0.2 inch/min.

EXAMPLES 1-2

Examples C1-C2, along with the test results thereon, are described in Table I, below.

The inclusion of 1% of LLDPE into polyoxymethylene significantly increased the elongation at break of polyoxymethylene from 27.4% (Control Example C1) to 52.0% (Example 1) and 39.6% (Example 2). In contrast, the inclusion of 1% of LDPE into polyoxymethylene (Control Example C2) had essentially no effect on the elongation of the polyoxymethylene.

TABLE I

| Eg. No. | Wt. % Polyethylene | Sample Elongation At Break | Percent Improvement In Elongation Relative To C1* |
|---|---|---|---|
| C1 | — | 27.4% | 0% |
| 1 | 1.0% LLDPE 1 | 52.0% | 90% |
| 2 | 1.0% LLDPE 2 | 39.6% | 45% |
| C2 | 1.0% LDPE 1 | 29.3% | 7% |

*Determined by the following formula:
$$\frac{\text{Sample Elongation at Break}}{\text{C1 Elongation at Break}} - 1 \times 100\%$$

EXAMPLES 3-14

The components of Examples 3-14 and Control Example 3 are listed in Table II, below.

The results for each example showed that the inclusion of between 1% and 3% linear low density polyethylene into polyoxymethylene significantly increased the elongation of polyoxymethylene.

TABLE II

| Eg. No. | Wt. % Polyethylene | Sample Elongation At Break | Percent Improvement In Elongation Relative To C3* |
|---|---|---|---|
| C3 | — | 26.7% | 0% |
| 3 | 1% LLDPE 1 | 54.9% | 106% |
| 4 | 2% LLDPE 1 | 63.8% | 139% |
| 5 | 3% LLDPE 1 | 41.3% | 55% |
| 6 | 1% LLDPE 2 | 60.8% | 128% |
| 7 | 2% LLDPE 2 | 33.6% | 26% |
| 8 | 3% LLDPE 2 | 50.8% | 90% |
| 9 | 1% LLDPE 3 | 41.0% | 54% |
| 10 | 2% LLDPE 3 | 37.3% | 40% |
| 11 | 3% LLDPE 3 | 33.9% | 27% |
| 12 | 1% LLDPE 4 | 47.1% | 76% |
| 13 | 2% LLDPE 4 | 47.1% | 76% |
| 14 | 3% LLDPE 4 | 46.9% | 76% |

*Determined by the following formula:
$$\frac{\text{Sample Elongation at Break}}{\text{C3 Elongation at Break}} - 1 \times 100\%$$

I claim:

1. A composition consisting essentially of
   (a) 97-99.8 weight percent of a polyoxymethylene polymer and
   (b) 0.2-3.0 weight percent of a linear low density polyethylene
   wherein the weight percents are based upon the weight of component (a) and (b) only.

2. The composition of claim 1 wherein the polyoxymethylene polymer is a homopolymer.

3. The composition of claim 1 wherein the polyoxymethylene polymer is a copolymer.

4. The composition of claim 1 wherein the linear low density polyethylene is a copolymer of ethylene and an alpha-olefin comonomer.

5. The composition of claim 1 wherein the linear low density polyethylene is a carrier resin in a color concentrate.

6. The composition of claim 5 wherein the color concentrate is comprised of 1-90 weight percent pigment and 10-99 weight percent linear low density polyethylene.

7. The composition of claim 1 further comprising at least one of thermal stabilizers, antioxidants, colorants, toughening agents, reinforcing agents, UV stabilizers, hindered amine light stabilizers, nucleating agents, lubricants, polytetraflouroethylene powder, polytetraflouroethylene fiber, and fillers.

8. The composition of claim 5 further comprising at least one of thermal stabilizers, antioxidants, toughening agents, reinforcing agents, UV stabilizers, hindered amine light stabilizers, nucleating agents, lubricants, polytetraflouroethylene powder, polytetraflouroethylene fiber, and fillers.

9. The composition of claims 7 or 8 wherein the thermal stabilizer is selected from polyamide, polyethylene vinyl alcohol, polyacrylamide, poly-beta-alanine, microcrystalline cellulose, and mixtures thereof.

10. Shaped articles made from the composition of claim 1.

11. Shaped articles made from the composition of claim 5.

* * * * *